United States Patent
Chigapov et al.

(10) Patent No.: US 8,052,937 B2
(45) Date of Patent: *Nov. 8, 2011

(54) SOOT OXIDATION CATALYST AND METHOD OF MAKING

(75) Inventors: Albert Chigapov, Aachen (DE); Alexei Dubkov, Aachen (DE); Brendan Carberry, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/784,209

(22) Filed: May 20, 2010

(65) Prior Publication Data
US 2010/0223918 A1  Sep. 9, 2010

Related U.S. Application Data

(63) Continuation of application No. 11/385,005, filed on Mar. 20, 2006, now Pat. No. 7,771,669.

(51) Int. Cl.
*B01D 53/46* (2006.01)
*B01J 23/10* (2006.01)
*B01J 23/42* (2006.01)
*B01J 23/44* (2006.01)
*B01J 23/50* (2006.01)
*B01J 23/63* (2006.01)
*B01J 23/66* (2006.01)

(52) U.S. Cl. .......... 422/180; 60/299; 422/177; 502/150; 502/232; 502/242; 502/263; 502/303; 502/314; 502/318; 502/346; 502/348; 502/355

(58) Field of Classification Search ....... 423/210–215.5; 60/299; 422/177, 180; 502/150, 232, 242, 502/263, 303, 314, 318, 346, 348, 355
See application file for complete search history.

(56) References Cited

U.S. PATENT DOCUMENTS
3,899,444 A  8/1975 Stephens
(Continued)

FOREIGN PATENT DOCUMENTS
DE  10214343 A1  10/2003
(Continued)

OTHER PUBLICATIONS

Zhao et al. "Preparation of High-Surface-Area G-Alumina by Assistance of Sucrose", May 2004, Chinese Journal of Catalysis, Abstract.*

(Continued)

*Primary Examiner* — Wayne Langel
*Assistant Examiner* — Syed Iqbal
(74) *Attorney, Agent, or Firm* — Damian Porcari; Dinsmore & Shohl LLP

(57) ABSTRACT

A catalyst composition for facilitating the oxidation of soot from diesel engine exhaust is provided. The catalyst composition includes a catalytic metal selected from Pt, Pd, Pt—Pd, Ag, or combinations thereof, an active metal oxide component containing Cu and La, and a support selected from alumina, silica, zirconia, or combinations thereof. The platinum group metal loading of the composition is less than about 20 g/ft$^3$. The catalyst composition may be provided on a diesel particulate filter by impregnating the filter with an alumina, silica or zirconia sol solution modified with glycerol and/or saccharose, impregnating the filter with a stabilizing solution, and impregnating the filter with a solution containing the active metal oxide precursor(s) and the catalytic metal precursor(s). The resulting catalyst coated diesel particulate filter provides effective soot oxidation, exhibits good thermal stability, has a high BET surface area, and exhibits minimal backpressure.

10 Claims, 5 Drawing Sheets

U.S. PATENT DOCUMENTS

| | | | |
|---|---|---|---|
| 4,711,870 | A | 12/1987 | Yamada et al. |
| 4,759,918 | A | 7/1988 | Homeier et al. |
| 4,900,517 | A | 2/1990 | Domesle et al. |
| 5,075,274 | A | 12/1991 | Kiyohide et al. |
| 5,100,632 | A | 3/1992 | Dettling et al. |
| 5,330,945 | A | 7/1994 | Beckmeyer et al. |
| 5,610,117 | A | 3/1997 | Horiuchi et al. |
| 5,746,989 | A | 5/1998 | Murachi et al. |
| 5,911,961 | A | 6/1999 | Horiuchi et al. |
| 6,143,691 | A | 11/2000 | Shiraishi et al. |
| 6,166,283 | A | 12/2000 | Bharadwaj et al. |
| 6,248,689 | B1 | 6/2001 | Manson |
| 6,764,664 | B2 | 7/2004 | Zhang |
| 6,855,661 | B2 | 2/2005 | Kim |
| 7,678,348 | B2 | 3/2010 | Han et al. |
| 2002/0127252 | A1 | 9/2002 | Kramer et al. |
| 2003/0162656 | A1 | 8/2003 | Wu et al. |
| 2004/0018939 | A1 | 1/2004 | Chigapov et al. |
| 2005/0145827 | A1* | 7/2005 | McCabe et al. ............. 252/189 |
| 2005/0207956 | A1 | 9/2005 | Vierheilig |
| 2006/0120936 | A1 | 6/2006 | Alive et al. |
| 2007/0238606 | A1 | 10/2007 | Han et al. |
| 2008/0026141 | A1* | 1/2008 | Pfeifer et al. ............. 427/201 |
| 2009/0126353 | A1 | 5/2009 | Han et al. |
| 2009/0257934 | A1 | 10/2009 | Han et al. |

FOREIGN PATENT DOCUMENTS

| | | | |
|---|---|---|---|
| EP | 0160482 | A2 | 11/1985 |
| EP | 0164881 | A1 | 12/1985 |
| EP | 0658369 | A2 | 6/1995 |
| EP | 0758713 | A1 | 2/1997 |
| EP | 1048341 | A1 * | 11/2000 |
| EP | 1055805 | A1 | 11/2000 |
| EP | 1295637 | A1 | 3/2003 |
| EP | 1356864 | A1 | 10/2003 |
| EP | 1398069 | A2 | 3/2004 |
| EP | 1717422 | B1 * | 8/2009 |
| JP | 11253757 | A | 9/1999 |
| JP | 2003278536 | A | 10/2002 |
| JP | 2004351243 | A * | 12/2004 |
| WO | WO 9416817 | A1 | 8/1994 |
| WO | WO 0029726 | A1 | 5/2000 |
| WO | WO 0112320 | A1 | 2/2001 |
| WO | WO 2005051523 | A1 | 6/2005 |
| WO | 2007004774 | A1 | 1/2007 |

OTHER PUBLICATIONS

Wu, Y. et al. "The role of redox property of $La_{2-x}(Sr, Th)_x CuO_{4\pm\lambda}$ playing in the reaction of NO decomposition and NO reduction by CO", Journal of Molecular Catalysis A:Chemical 155 (2000) pp. 89-100.

Peter, S.D. et al., "Catalytic properties of $La_2CuO_4$ in the CO + NO reaction" Catalysis Letters, vol. 54, Nos. 1-2 (1998) pp. 79-84.

Brooke, Lindsay; BASF unveils simpler, lighter, "two-brick" aftertreatment system; Automotive Engineering International Online; Apr. 26, 2010; www.sae.org/mags/AEI/8153.

CN Office Action dated Jan. 11, 2011 pertaining to Chinese Application Serial No. 200710126502.9.

US Office Action dated Aug. 13, 2010 pertaining U.S. Appl. No. 12/784,250, filed May 20, 2010.

* cited by examiner

SOOT OXIDATION CATALYST AND METHOD OF MAKING

CROSS-REFERENCE TO RELATED APPLICATIONS

This application is a continuation of U.S. patent application Ser. No. 11/385,005 filed Mar. 20, 2006 now U.S. Pat. No. 7,771,669, entitled SOOT OXIDATION CATALYST AND METHOD OF MAKING. The entire contents of said application is hereby incorporated by reference.

BACKGROUND OF THE INVENTION

The present invention relates to a catalyst composition for the combustion of particulates from diesel engine exhaust, and more particularly, to a catalyst composition which facilitates the oxidation of soot during the regeneration of diesel particulate filters and which contains little or no platinum group metals.

In recent years, environmental regulations in the United States and Europe restricting diesel particulate emissions have necessitated improvements in the removal of particulates from diesel engine emissions. Such particulates generally consist of carbonaceous particulates in the form of soot. Currently, the most commonly used method for removing soot from engine exhaust is the use of a diesel particulate filter ("DPF") which collects the soot, followed by oxidation of the accumulated particulates at elevated temperatures which regenerates the filter.

The first types of diesel particulate filters were installed in urban buses and passenger cars as early as 1986. However, a problem with the use of such diesel particulate filters is that regeneration of the filter by soot oxidation is difficult due to the low temperatures of diesel exhaust gases (e.g., less than about 200° C.), which are unfavorable for soot oxidation. Accordingly, it is necessary to use periodic high-temperature regeneration of the filter to oxidize the soot at elevated temperatures.

More recently, a particulate filter system has been used in European diesel passenger cars which relies on fuel-borne catalytic assistance in the regeneration of the DPF, i.e., the inclusion of a catalyst, typically metal, in the fuel as an additive which functions to lower the temperature at which carbon combusts. However, such a system is complex and requires additional components such as a tank for fuel additives, an additive dosing system, and infrastructure to refill the additive fuel tank. In addition, the use of fuel-borne catalysts can lead to the formation of ash which accumulates on the filter, causing gradual loss of filter soot capacity and a decrease in time between regeneration events. Therefore, it is necessary to change the filter after about every 80 K kilometers.

Also known in the art are "continuously regenerating traps" (CRT®), which comprise a platinum-based diesel oxidation catalyst ("DOC") positioned upstream of a diesel particulate filter. Such a trap uses $NO_2$ generated on the Pt-containing DOC for soot oxidation. However, when used in diesel passenger cars, the amount of $NO_x$ emitted is insufficient to provide complete soot oxidation due to lower $NO_x$/soot ratio. Accordingly, it is still necessary to use periodic high-temperature regeneration of the filter using oxygen from air to oxidize the soot at elevated temperatures.

Another known method for removing soot is to deposit a catalyst on the walls of the DPF, also referred to as a "catalyzed DPF." A catalyzed soot filter typically comprises one or more platinum group metal catalysts and is less complex than fuel-borne catalysts. See, for example, WO 00/29726, EP 0160482, EP 0164881 and U.S. Pat. No. 5,100,632. See also WO 01/12320, which teaches the use of platinum or palladium-containing oxidation catalysts within a diesel particulate filter to improve soot oxidation on the filter.

Catalyzed DPFs containing platinum group metals are also described in DE 10214343A1, U.S. Pat. No. 4,900,517, and EP1055805. See also U.S. Pat. No. 5,746,989, EP 0758713, JP 2003278536, and EP1398069, which teach a diesel particulate $NO_x$ reduction system utilizing platinum group metals. See also US 2002-127252, EP 0658369B1, U.S. Pat. Nos. 5,330,945, 4,759,918, 5,610,117, 5,911,961, 6,143,691 and JP 11253757, which teach particulate filters or traps containing platinum group metals.

However, in the catalyzed DPF system, the contact between the catalyst and soot is relatively loose, resulting in low catalyst activity for soot oxidation. Thus, in the catalyzed DPF system, it is more difficult to oxidize soot, and the oxidation typically requires higher temperatures. Further, regeneration of the filter requires that the catalyst be able to withstand temperatures of up to 1000 to 1200° C. This is a problem for noble metal catalysts as intensive sintering of such catalysts occurs at temperatures above 750° C.

Another problem with catalyzed diesel particulate filters currently in use is that they typically employ platinum group metal (PGM) compositions, particularly platinum-based formulations which are provided in the form of a catalytic coating, or washcoat. Such a coating is very expensive to manufacture due to the high cost of platinum group metals. Accordingly, it would be desirable to be able to eliminate all or part of the platinum group metals used in diesel particulate filters.

In addition, catalyst coatings containing platinum group metals are highly active and may result in undesirable reactions such as oxidation of $SO_2$ to $SO_3$, and the formation of sulfated ash and sulfated particulate. In order to minimize these side effects, many catalyst suppliers have tried to decrease the concentration of platinum group metals in catalyst coatings. However, this leads to lower activities in soot oxidation, thus compromising efficiency.

In commonly-assigned (Ford) application EP 1356864, a catalytic composition is taught for soot oxidation which is free of platinum group metals. However, such a composition is adapted for use in soot oxidation in the presence of $NO_x$ as a soot oxidant, not to high-temperature soot oxidation in the presence of oxygen.

Accordingly, there is still a need in the art for a catalyst which can be used in a diesel particulate filter, which contains little or no platinum group metals, and which can effectively oxidize soot by oxygen during periodic high temperature regenerations.

SUMMARY OF THE INVENTION

The present invention meets those needs by providing a catalyst composition for use in a diesel particulate filter which uses little or no platinum group metals (PGM), and which effectively oxidizes soot.

According to one aspect of the present invention, a catalyst composition is provided for facilitating soot oxidation which comprises a catalytic metal selected from Pt, Pd, Pt—Pd, Ag, or combinations thereof and an active metal oxide component containing Cu and La; wherein when the catalytic metal comprises a platinum group metal, the platinum group metal (PGM) loading in the composition is less than about 20 g/ft³. Preferably, the PGM loading is about 15 g/ft³.

Preferably, the catalyst composition further includes a support selected from alumina, silica, zirconia, and combinations thereof. Preferably, the support material has been stabilized with lanthanum, zirconium, aluminum, or combinations thereof. By "stabilized," it is meant that the support material is prevented from sintering at high temperatures, i.e., temperatures greater than about 1000 to 1200° C. which may be encountered during regeneration of a diesel particulate filter.

The active metal oxide component preferably comprises $CuO$—$La_2CuO_4$, which provides good soot oxidation properties to the catalyst composition.

The catalyst composition of the present invention is preferably provided on a diesel particulate filter or other porous substrate for providing oxidation of soot accumulated on the filter. In a preferred method of providing the catalyst on the filter, a diesel particulate filter is first impregnated with a colloidal solution selected from alumina sol, silica sol, zirconia sol, or combinations thereof, which, when dried, forms a support material for the catalyst. Preferably, the colloidal solution further includes an organic compound selected from saccharose, glycerol, and combinations thereof. Such organic compounds function to improve the surface area of the coating. After coating the filter with the colloidal solution, the impregnated filter is then dried and calcined.

The filter is then impregnated with a stabilizing solution to prevent sintering of the support. Where the colloidal solution comprises an alumina sol, the stabilizing solution comprises zirconyl acetate, lanthanum nitrate, or a combination thereof. Where the colloidal solution comprises silica sol, the stabilizing solution comprises zirconyl acetate, aluminum nitrate, or a combination thereof. Where the colloidal solution comprises zirconia sol, the stabilizing solution comprises lanthanum nitrate.

After impregnation with the stabilizing solution, the coated filter is again dried and calcined. Next, the filter is impregnated with a solution containing a metal oxide precursor selected from copper nitrate, lanthanum nitrate, and mixtures thereof, and a catalytic metal precursor selected from silver nitrate, palladium nitrate, dihydrogen hexachloroplatinate, and combinations thereof. The impregnated filter is then dried and calcined.

Where the diesel particulate filter has been coated with a composition which includes a colloidal solution comprising alumina sol or silica sol, the coated filter preferably has a BET surface area of at least 30-40 $m^2/g$. Where the filter has been coated with a composition containing a zirconia sol, the coated filter preferably has a BET surface area of at least 9-12 $m^2/g$.

The present invention also provides a diesel exhaust gas treatment system comprising a diesel particulate filter for receiving diesel exhaust gas from a diesel engine and a catalyst composition impregnated in the filter, where the catalyst composition comprises a catalytic metal selected from Pt, Pd, Pt—Pd, Ag, or combinations thereof and an active metal oxide component containing Cu and La; where the platinum group metal loading in the catalyst composition is less than about 20 $g/ft^3$.

When incorporated in such a diesel exhaust treatment system, the catalyst composition of the present invention is capable of oxidizing soot at a temperature of between about 550° C. and 600° C.

Accordingly, it is a feature of the present invention to provide a catalyst composition having little or no platinum group metal loading which provides effective oxidation of soot. Other features and advantages will be apparent from the following description and the accompanying drawings.

DETAILED DESCRIPTION OF THE PREFERRED EMBODIMENT

Figure 1:
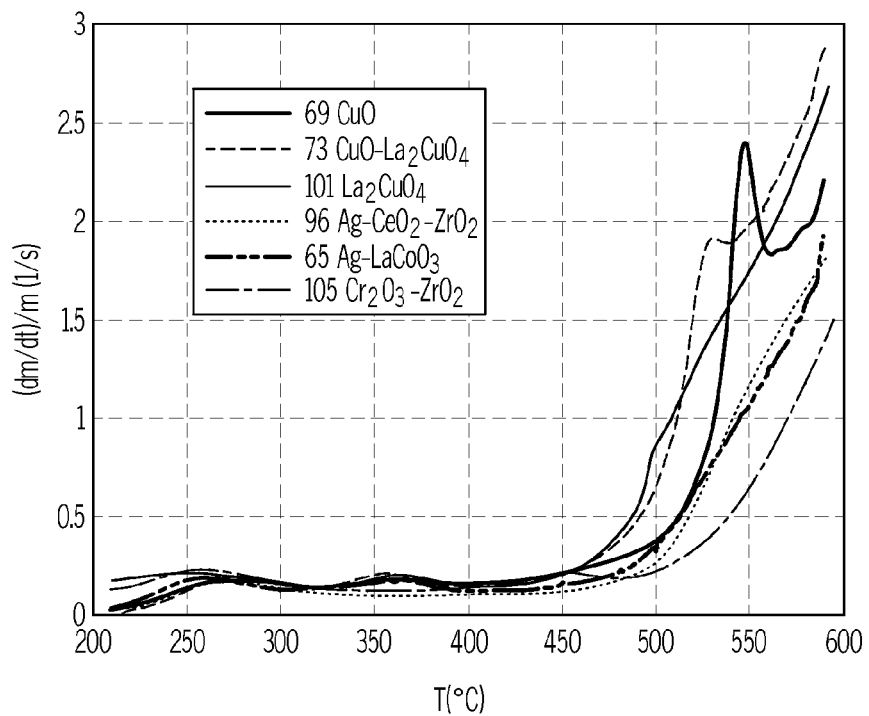
FIG. 1 is a graph illustrating soot oxidation activity for metal oxide-containing catalysts made in accordance with the present invention.

We have found that a synergistic effect results from the combination of the catalytic metals Ag, Pt and/or Pd with the metal oxide component $CuO$—$La_2CuO_4$ for use as a catalyst in soot oxidation. This combination decreases the temperature necessary for soot oxidation while decreasing the loading of costly Pt and Pd. While not wishing to be bound by any particular theory, we believe that the synergetic effect resulting from the combination may be due to the presence of the noble metal which facilitates partial copper reduction to induce the copper-containing system to be more active in soot oxidation, while the copper containing compound functions as an oxygen supplier for the noble metals.

The catalyst composition of the present invention provides comparable or better soot oxidation properties than commercial formulations having much higher noble metal loadings. In addition, when coated onto a diesel particulate filter, the catalyst composition provides good thermal stability, minimal backpressure, and high surface area. By "thermal stability" it is meant that the catalyst maintains its activity or oxidation performance even after exposure to high temperatures. By "backpressure," it is meant the resistance to flow which is caused when the filter pores become blocked or are decreased in size, e.g., from the accumulation of soot or the coating of the catalyst onto the filter. By "minimal backpressure" it is meant that, when coated onto the filter, the catalyst coating of the present invention increases the backpressure of the filter only slightly.

Preferred catalytic metals for use in the catalyst composition include Pt, Pd, Pt—Pd, Ag, or combinations thereof. The preferred metal oxide component has a Cu/La ratio of 1:1 and preferably comprises $CuO$—$La_2CuO_4$.

The catalyst composition of the present invention is preferably supported on a refractory oxide to increase its surface area, and consequently, its activity in soot oxidation. The refractory oxide support also functions to increase the thermal stability of the catalyst to high temperatures encountered in diesel particulate filter applications. Preferred refractory oxides for use in the present invention include alumina, silica, and zirconia.

Such refractory oxides are preferably deposited on a diesel particulate filter by impregnating the filter with a colloidal solution selected from alumina sol, silica sol, zirconia sol, or combinations thereof. We have found that impregnating diesel particulate filters with such a sol solution avoids blocking the pores of the filter (monolith), resulting in minimal backpressure. While coating with a slurry has been commonly used for coating of filters (monoliths) with catalysts such as 3-way catalysts, a slurry is not feasible for coating on a diesel particulate filter as the average pore diameter of a silicon carbide (SiC) substrate material is about 9 microns. Coating such a substrate material with a slurry would block the pores or significantly decrease their diameter because the size of particles in such a slurry is comparable or higher than the size of the pores in the filter.

While sols have been used for monolith coatings in automotive catalysis, typically only about 5 wt. % sol has been used for the purpose allowing larger slurry particles to adhere to the surface. However, we have found that the sol solution itself can provide good high surface area coating of the catalyst on porous filter materials such as diesel particulate filters.

The average particle size of the sols is preferably 0.004 to 0.01 microns for silica sol, 0.05 microns for alumina sol, and 0.005-0.001 microns for zirconia sol. Preferred sols for use in the present invention are commercially available from Alfa Aesar. The amount of sol used will vary depending on the porosity of the substrate material. Typically, about 520-550 ml of sol is used for a standard filter size of 5.66 inches×6 inches having a porosity of 65% (made from cordierite) while about 350 ml of sol is used for silicon carbide filters having a porosity of 42%.

We have found that in a typical porous filter material (diesel particulate filter made from cordierite or SiC), after absorption of 300 to 550 ml of solution (5.66"×6" filter), the BET surface area is about 24-30 $m^2/g$ after one coating with 20% alumina sol or 30% silica sol. It is preferred that the particle size of the sol solutions be at least 2 orders lower than the filter pore size to avoid blocking of the pores.

We have additionally found that the surface area of the catalyst coating is significantly improved by adding organic compounds such as saccharose and glycerol to the sol solution (see Table 2). Such organic compounds also prevent the increase in size of primary particles in the alumina, zirconia or silica sols. Saccharose functions as a templating agent, while glycerol functions to prevent the sticking of primary particles. Both compounds additionally decrease the crystallization of alumina and the collapse of the monolith structure during the drying step. It should be noted that pure sugar may be used instead of saccharose with the same results. Preferably, 5-10 g of saccharose and 10-30 ml of glycerol are added to 1 L of sol solution. While higher concentrations will further increase the surface area, we have found that such higher concentrations also increase the solution viscosity, which is undesirable for coating purposes.

After application of the sol on the filter by impregnation, the filter is preferably dried at a temperature of about 77 to 100° C. and calcined at a temperature of about 285° C. for about 1 hour to form the support for the catalyst.

In order to maintain the surface area of the sol coating and to prevent sintering of the support at high temperatures (e.g., regeneration temperatures up to 1200° C.), it is preferable to stabilize the alumina, silica, or zirconia support material after it is coated onto the monolith and dried/calcined. Where the support comprises alumina, the alumina is stabilized by impregnation with zirconium and/or lanthanum precursors, preferably zirconyl acetate and lanthanum nitrate. Preferably, 10-15% Zr (mol % to Al) and 3-5 La (mol % to Al) is used. Where the support comprises silica, a solution of zirconyl acetate is preferred for stabilization. Preferably, 10-20% Zr (mol % to Si) is used. In addition, aluminum (aluminum nitrate) may be added to further increase the thermal stability of the support, up to about 5 mol %. Where the support comprises zirconia, a lanthanum solution is used. Preferably, 3-5% La (mol % to Zr) is used. After application of the stabilizing solution, the coated filter is again dried at about 77 to 100° C. and calcined at about 800° C. for about 2 hours.

After stabilization, the filter is then impregnated with a washcoat solution containing the active metal oxide precursor selected from copper nitrate, lanthanum nitrate, and mixtures thereof, and the catalytic metal precursor selected from silver nitrate, palladium nitrate, and dihydrogen hexachloroplatinate, and combinations thereof.

The catalyst washcoat solution preferably further includes a small amount of citric acid, preferably about 35-40 g per filter, which aids in providing a homogeneous deposition of the catalyst on the filter.

The washcoat solution may also include one or more nitrates selected from yttrium nitrate, magnesium nitrate, iron nitrate, cerium nitrate, and cobalt nitrate. The nitrates are preferably added in small amounts of about 1-4 g to further stabilize the support and/or the catalyst against sintering.

After impregnation of the catalyst washcoat, the coated filter is preferably calcined at about 750° C. for about 16 hours.

Thus, the catalyst composition of the present invention may be provided on a diesel particulate filter in a three-step process in which the filter is 1) impregnated with a colloidal solution, 2) impregnated with a stabilizing solution, and 3) impregnated with a catalyst washcoat. While the catalyst composition is described herein as being coated onto a diesel particulate filter, it should be appreciated that the composition may also be provided on other porous substrates such as mullite, aluminum titanate, alumina, etc. The catalyst composition is preferably coated onto a diesel particulate filter comprised of porous cordierite or silicon carbide (SiC).

Where the diesel particulate filter is comprised of SiC, the catalyst-coated filter preferably has a BET surface area of at least 30-40 $m^2/g$ where the support material comprises alumina or silica. Where the support material comprises zirconia, the BET surface area is about 9-12 $m^2/g$.

The diesel particulate filter including the catalyst composition therein may be used in a diesel exhaust gas treatment system to provide effective soot oxidation. The catalyst composition preferably provides from about 60 to 100% soot oxidation at a targeted temperature of regeneration between about 550 and 600° C., and more preferably, provides about 80 to 100% soot oxidation. Typically, during regeneration, additional fuel is injected into the engine, and a diesel oxidation catalyst positioned upstream from the diesel particulate filter combusts the additional fuel, resulting in the release of heat. This heat increases the temperature of the diesel particulate filter up to about 600° C., which is sufficient to oxidize any accumulated soot on the filter.

In order that the invention may be more readily understood, reference is made to the following examples which are intended to illustrate the invention, but not limit the scope thereof.

Example 1

Preparation of Catalyst Composition on Powder Samples

A catalyst composition was prepared in accordance with the present invention. A silicon carbide (SiC) powder was prepared by grinding commercial SiC square units to form a filter substrate material having a porosity of 60%. The SiC powder obtained was then sieved to obtain a fraction of 0.1 to 0.125 mm. This SiC powder was then coated with a solution containing alumina sol and saccharose (pure crystal sugar) and glycerol. The samples were dried 100° C. and calcined at 625° C. for 1 hour.

The alumina was then stabilized by impregnation with solutions of zirconyl acetate and lanthanum nitrate (3-5% La and 10-15% Zr; molar % of La and Zr to Al) followed by drying and calcining at 800° C. for 2 hours.

Next, the samples were impregnated with a water solution containing the catalyst precursor salts, i.e., copper nitrate, lanthanum nitrate, and citric acid and the precious metal precursors, e.g., silver nitrate, palladium nitrate, and dihydrogen hexachloroplatinate ($H_2PtCl_6$, chloroplatinic acid). The samples were then calcined at 750° C. for 16 hours.

Example 2

Thermogravimetric and Flow Reactor Testing

Catalyst compositions prepared in accordance with the present invention were characterized using a thermogravimetric analysis-mass spectrometry (TGA-MS) method using a Hiden IGA-003 analyzer equipped with a mass spectrometer. In the procedure used, 240 mg of SiC powder with a deposited catalyst (20 wt % catalyst loading on powdered SiC (Ibiden) high porosity substrate) and 60 mg of real diesel soot were used. The catalyst/soot weight ratio was 4/1. Prior to testing, the catalyst and soot were mixed in a mortar with a spatula to provide loose contact between the catalyst and soot to simulate typical soot-catalyst content on a catalyzed filter. The samples were first heated in a reaction gas (6% $O_2$—He; flow rate 100 cc/min) from 40° C. to 200° C. with a heating rate of 20° C./min. and maintained at 200° C. for 20 minutes to remove all soluble organic fraction of soot (SOF), and then heated from 200° C. to 600° C. at 20° C./min. After reaching 600° C., the sample was kept under isothermal conditions for 30 minutes and then cooled down. The gas leaving the reactor was analyzed for $CO/N_2$, $H_2O$, $O_2$ and $CO_2$ using quadruple MS Hiden HPR-20. The indicated sample temperature was measured by a thermocouple placed at approximately 1 cm distance from the crucible.

Initially, more than 100 different oxide and mixed oxide catalysts without noble metals were evaluated on their activity in soot oxidation at 500-650° C. by the TGA-MS method. Among all catalysts tested, only Cu, Ag, and Cr-containing compositions were found to be active in soot oxidation below 600° C. as can be seen in FIG. 1. The activity of copper-containing catalysts was higher than that of silver and chromium compounds. The most active composition at low temperatures was $La_2CuO_4$. This compound is known to have a $K_2NiF_4$ structure (See Y. Wu et al., *J. Molec. Catalysis* A:155 (2000) pp. 89-100 and S. D. Peter et al., *Catalysis Letters* 54 (1998) pp. 79-84).

Copper oxide (CuO) was also active, especially at 550° C., but demonstrated lower activity in comparison with lanthanum-copper mixed oxide $La_2CuO_4$ at lower temperatures, while its activity was higher than $La_2CuO_4$ at 550° C. (see FIG. 1). In attempting to combine the best properties provided by CuO and $La_2CuO_4$, we further tested the solid solutions of CuO—$La_2CuO_4$. As $La_2CuO_4$ is the only compound in the copper oxide-lanthanum oxide binary system, the formation of solid solutions of CuO—$La_2CuO_4$ is typical when the concentration of copper oxide is higher than in $La_2CuO_4$, e.g., the Cu/La molar ratio is higher than 1:2. (see "Handbook of status diagrams for systems for hardly melting metals," S-Petersburg, Nauka (*Science*) 1997). Such solid solutions demonstrated the best soot oxidation properties exceeding those of the individual components, CuO and $La_2CuO_4$.

The CuO—$La_2CuO_4$ compound (Cu/La ratio 1/1) was found to be the most active compound as shown in FIG. 1. It was also noted that this solid solution oxidized soot without any oxygen in the gas phase, i.e., up to 30% of soot was oxidized using only nitrogen flow at 550-600° C., so the catalyst was able to oxidize soot using only its matrix oxygen. This property is very valuable for high soot loading of the filter, when oxygen access through the pores of the filter (when loaded with soot) is limited and soot oxidation is slow due to the limited oxygen supply.

The copper oxide-lanthanum oxide solid solution and different noble metal compositions including combinations of noble metals and CuO—$La_2CuO_4$ were also tested in a flow reactor to determine their activity in soot oxidation. The quartz flow reactor was equipped with an electrical heater and temperature-programmed controller. The reaction gas mixture was 10% $O_2$ in nitrogen. The soot and powder catalyst were mechanically mixed using a spatula to imitate loose contact typical for soot oxidation on a filter. The ratio of catalyst to soot was 4/1 (40 mg catalyst to 10 mg of soot). The reactor effluent gases were analyzed using an electrochemical analyzer "Testo-33" (Eco-Intech), thermochemical sensor, and gas chromatography. The gas flow rate used was 30 ml/min.

Catalyst PM-2 was used as a reference sample modeling commercial platinum-containing compositions. Samples PM-3, PM-9 and PM-12 were also tested as reference Pt-containing compositions. The results are shown below in Table 1.

TABLE 1

Soot conversion on different catalysts in reaction mixture of 10% $O_2$ in nitrogen, 10 mg soot and 40 mg of catalyst, feed flow rate 30 ml/min., temperature ramp 10° C./min.

| Sample ID | 10% soot conversion (° C.) | 50% soot conversion (° C.) | 90% soot conversion (° C.) |
|---|---|---|---|
| PM-1 Cu—Co spinel | 490 | 558 | 610 |
| PM-2 Pt/$CeO_2$ | 458 | 542 | 593 |
| PM-3 Pt—$CoLaO_3$ perovskite | 470 | 546 | 592 |
| PM-4 Cu—Ce—Fe | 465 | 543 | 600 |
| PM-5 Pt—CuO—$La_2CuO_4$ | 458 | 528 | 578 |
| PM-6 Ag—CuO—$La_2CuO_4$ | 438 | 519 | 578 |
| PM-7 CuO | 457 | 547 | 602 |
| PM-8 Pd—CuO—$La_2CuO_4$ | 438 | 511 | 568 |
| PM-9 Pd—$CeO_2$ | 472 | 563 | 611 |
| PM-10 CuO—$La_2CuO_4$ | 457 | 532 | 592 |
| PM-11 Ag/$CeO_2$ | 473 | 560 | 610 |
| PM-12 Pt—Co—Mn | 465 | 546 | 596 |
| PM-13 $La_2CuO_4$ | 460 | 533 | 598 |

All samples were prepared on stabilized alumina-washcoated SiC powder as described above.

As can be seen, the CuO—$La_2CuO_4$ composition (PM10) showed activity comparable with the activity of platinum group metal (PGM) catalysts, including the reference PM-2, PM-3, PM-9 and PM-12 samples. Also as shown, the combination of Pd, Pt and Ag with CuO—$La_2CuO_4$ (PM-5, 6 and 8) as used in the present invention demonstrated the lowest temperatures of soot oxidation initiation, as evaluated from the temperature of 10% soot conversion, average rate of soot oxidation (which can be evaluated from 50% soot conversion), and temperature of near complete soot oxidation, which can be evaluated from 90% soot conversion. It is believed that the reason for the synergy between the platinum group metal or Ag and Cu-containing oxide component is that the precious metal component facilitates partial copper oxide reduction which is favorable for soot oxidation, while the copper-based oxide component functions as an oxygen supplier for the metal component.

Example 3

Coating Method for Filters

A number of porous substrates were coated with an alumina sol, a zirconia sol, or a silica sol containing various amounts of glycerol and/or saccharose. The BET surface areas of the coated substrates were then measured by $N_2$ adsorption at 77K using Micromeritics 2010 ASAP equipment. The results are shown below in Table 2.

TABLE 2

| Coating | Number of coatings | Substrate/ porosity (%) | BET, $m^2/g$ |
|---|---|---|---|
| 20% alumina sol | 1 | Cordierite - 65% | 24 |
| 20% alumina sol | 2 | Cordierite - 65% | 31 |
| 20% alumina sol + glycerol | 1 | Cordierite - 65% | 32 |
| 20% alumina sol + saccharose | 1 | Cordierite - 65% | 29 |
| 20% alumina sol + glycerol + saccharose | 1 | Cordierite - 65% | 37 |
| 20% alumina sol + glycerol + saccharose | 2 | Cordierite - 65% | 56 |
| 30% silica sol | 1 | Cordierite - 65% | 31 |
| 30% silica sol + glycerol + saccharose | 1 | Cordierite - 65% | 40 |
| 20% zirconia sol | 1 | Cordierite - 65% | 7 |
| 20% zirconia sol + glycerol + saccharose | 1 | Cordierite - 65% | 12 |
| 20% alumina sol | 1 | SiC - 60% | 19 |
| 20% alumina sol + glycerol + saccharose | 1 | SiC - 60% | 30 |
| 20% alumina sol | 1 | Composite - 85% | 54 |
| 20% alumina sol + glycerol + saccharose | 1 | Composite - 85% | 94 |
| 30% silica sol | 1 | Composite - 85% | 75 |
| 30% silica sol + glycerol + saccharose | 1 | Composite - 85% | 89 |

As can be seen, the BET surface area after coating with the sol solution modified with glycerol and/or saccharose exceeded the surface area for a commercial coating which was in the range of 12 to 25 $m^2/g$. As can be seen, the higher the porosity of the filter material, the higher the surface area obtained. Thus, an advantage of the coating method is that it allows for 1.5 to 2 times higher surface area, e.g. a surface area up to 90-95 $m^2/g$ for the most porous filter material.

Example 4

Stabilization of Supports

The alumina and silica samples of Example 3 were then stabilized after coating and calcination as follows. The alumina samples were impregnated with a solution containing zirconium and lanthanum precursors, i.e., zirconyl acetate and lanthanum nitrate. The silica samples were impregnated with zirconia using a solution of zirconyl acetate. Generally, 10-15% Zr (mol % to Al) and 3-5 La (mol % to Al) were used for stabilization of alumina and 10-20% Zr (mol % to Si) was used for stabilization of silica. The samples containing stabilized and non-stabilized alumina and silica on cordierite were then calcined at different temperatures and the specific surface area of alumina and silica was calculated from the data and is shown in Table 3 below.

TABLE 3

| | BET surface area, $m^2/g$ after calcinations for 2 hours | | |
|---|---|---|---|
| Support | 800° C. | 900° C. | 1050° C., 12 hours for $Al_2O_3$ 1000° C., 2 hours for $SiO_2$ |
| $SiO_2$ | 422 | 206 | 3 |
| 10% Zr-$SiO_2$ | 402 | 330 | 96 |
| 5% Al-20% Zr/$SiO_2$ | 335 | 282 | 159 |
| $Al_2O_3$ | 211 | 176 | 18 |
| 3% La-$Al_2O_3$ | 202 | 192 | 109 |
| 3% La-15% Zr/$Al_2O_3$ | 184 | 178 | 154 |

As can be seen, the thermal stability of alumina and silica was greatly improved at temperatures above 900° C. by stabilization using La and/or Zr.

Example 5

Catalyst Coating of Commercial Diesel Particulate Filters

Washcoats prepared in accordance with the present invention were coated onto commercially available diesel particulate filters made from silicon carbide and having 200 cpsi cell density, a porosity of 42% and 5.66"×6" in size. The method of preparing the washcoats was the same as in Example 1 except that a more diluted sol (typically 10% alumina sol or 15% silica sol) was used due to the lower porosity (42%) of the filters used. Typically, a 350 ml solution was applied to the DPFs, which is close to the water absorption capacity of the filters. The washcoats were coated onto a number of filters as described in further detail below.

Filter #55

Initial weight of the (uncoated) filter was 1921 g. First, the filter was impregnated with 10% alumina sol, modified with 10 ml of glycerol and 2.7 g of saccharose, dried at 100° C. overnight and calcined at 285° C. for 1 hour. Then, the filter was impregnated with a solution containing lanthanum nitrate (5% mol to alumina, i.e., a molar ratio of La/Al of 5 molecules La to 100 molecules of Al) and zirconyl acetate (15% mol alumina) followed by drying at 100° C. and calcining at 800° C. for 2 hours. The filter was then impregnated with a solution containing dihydrogen hexachloroplatinate (IV), copper nitrate and lanthanum nitrate, and small amounts of yttrium and magnesium nitrates and citric acid (38 g). Pt loading was 1.32 g (15 g/$ft^3$), Cu loading was 4.4 g, $La_2O_3$ loading was 6.4 g, MgO was 1.6 g and $Y_2O_3$ was 1.9 g. The filter was then calcined at 750° C. for 16 hours prior to further testing. The final weight of the filter was 1995 g.

Filter #56

Initial weight of the filter was 1919 g. The filter was prepared using the same impregnation, drying, and calcining conditions as described above with regard to Filter #55 except that 8% alumina sol was used, and La and Zr loading were 3 and 10% mol of alumina weight. A mixed Pt—Pd—CuO—$La_2CuO_4$ composition was used as the catalyst, using a solution containing palladium nitrate, dihydrogen hexachloroplatinate, copper nitrate, lanthanum nitrate, and a small amount of iron (III) nitrate. Pt loading was 0.88 g (10 g/$ft^3$), Cu loading was 3.6 g, $La_2O_3$ loading was 4.7 g, and $Fe_2O_3$ was 1.5 g. The final weight of the filter was 1979 g.

Filter #57

Initial weight of the filter was 1972 g. The filter was prepared as described above with regard to Filter #55 except that a 17.5% alumina sol was used. The catalyst comprised a solution containing palladium nitrate, copper nitrate, small amounts of iron and cerium nitrate. Pd loading was 1.32 g (15 g/ft$^3$), CuO loading was 9.6 g, $La_2O_3$ loading was 6.5 g, $Fe_2O_3$ was 1.5 g, and $CeO_2$ was 2.1 g. The final weight of the filter was 2073 g.

Filter #58

Initial weight of the filter was 1918 g. First, the filter was impregnated with a 35% solution of ammonium zirconium carbonate containing urea, and then dried at 100° C. and calcined at 257° C. for 1 hour. The zirconia coating was then stabilized by impregnation with lanthanum nitrate and calcination at 800° C. for 2 hours. Finally, a catalyst solution containing dihydrogen hexachloroplatinate, copper nitrate and lanthanum nitrate with a small amount of iron nitrate and citric acid was applied to the filter. The filter was then dried at 100° C. and calcined at 750° C. for 16 hours. Pd loading was 1.32 g (15 g/ft$^3$), CuO loading was 5.4 g, $La_2O_3$ loading was 4.3 g, and $Fe_2O_3$ was 1 g. The final weight of the filter was 1949 g.

Filter #59

Initial weight of the filter was 1944 g. The filter was impregnated with a 10% alumina sol, and stabilized with Zr and La as described above with regard to filter #56. A catalyst solution containing silver nitrate, copper nitrate, lanthanum nitrate and small amounts of cerium nitrate, iron nitrate and manganese nitrate, and citric acid was applied to the filter. The filter was dried at 77° C. and calcined at 750° C. for 16 hours. Ag loading was 20 g, CuO loading was 11.1 g, $La_2O_3$ loading was 7.7 g, $CeO_2$ was 2.1 g, $Fe_2O_3$ was 1.5 g, and $Mn_2O_3$ was 1.25 g. The final weight of the filter was 2044 g.

Filter #60

Initial weight of the filter was 1974 g. The filter was impregnated with a 15% silica sol containing 10 ml glycerol and 1.7 g saccharose, dried at 107° C. and calcined at 287° C. The silica coating was stabilized with 20% mol Zr from zirconyl acetate and 5 mol % of alumina from aluminum nitrate, then dried and calcined at 775° C. for 2 hours. The catalyst solution included palladium nitrate, dihydrogen hexachloroplatinate, copper nitrate, lanthanum nitrate and small amounts of cobalt nitrate, cerium nitrate, and iron nitrate, followed by drying at 77° C. and calcination at 750° C. for 16 hours. Pd loading was 0.66 g (7.5 g/ft$^3$), Pt loading was also 0.66 (7.5 g/ft$^3$), CuO loading was 8.0 g, $La_2O_3$ loading was 7.0 g, $CO_3O_4$ was 2.9 g, $CeO_2$ was 2.1 g, and $Fe_2O_3$ was 1.5 g. The final weight of the filter was 2074 g.

Example 6

Engine Testing Procedure

The coated sample filters were then tested on an engine dynamometer with 2.0 L common rail (CR) diesel engine equipped with a commercial diesel oxidation catalyst (DOC) in a close-coupled position. Distance between the DOC rear and the DPF front was approximately 10 cm. Fuel with a sulfur level of 500 ppm was used for comparative tests. The prototypes of commercial Pt-coated DPFs with Pt loading of 50-150 g per cubic feet were tested as reference DPFs, and an uncoated DPF made from SiC having the same porosity, size and cell density was also tested as a reference DPF.

The test procedure was as follows: 1) high temperature cleaning of filter at 600-610° C.; 2) pressure drop characterization and filter weighing under warm conditions (about 200° C.); 3) soot loading at 260° C.+/−15° C.; 4) pressure drop characterization and filter weighing under warm conditions; 5) regeneration with targeted pre-DPF temperature; and 6) pressure drop characterization and filter weighing under warm conditions.

Under the test conditions used, the degree of pressure drop recovery and soot mass oxidized during regeneration calculated from weight difference were adequate indicators of the regeneration performance.

The sequence of tests for each filter was as follows: 1) steady-state regeneration for 15 minutes at pre-DPF temperature of 550° C. and mass soot loading of 6 g/L to evaluate initial soot activity; 2) four regenerations with soot loading increasing from 4 to 10 g/L (4, 6, 8, 10 g/L) using a "drop-to-idle" scenario (i.e., the engine was switched off after the beginning of regeneration, providing low flow through the filter and high oxygen concentration, causing the highest peak temperature during regeneration) to evaluate filter regeneration under severe conditions, i.e., conditions favorable for development of high peak temperatures inside DPF; 3) steady-state regeneration for 15 minutes at pre-DPF temperature of 550° C. and mass soot loading of 6 g/L to evaluate activity of aged catalyst after all regenerations.

Figure 2A:
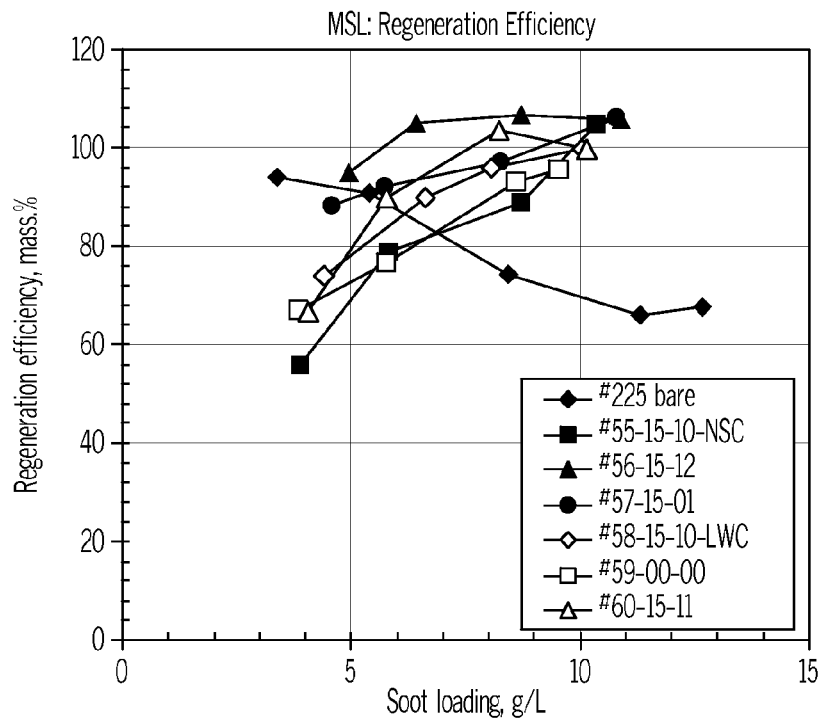
FIGS. 2A and 2B are graphs illustrating the regeneration efficiency of washcoated filters of the present invention compared with commercially coated filters.
Figure 2B:
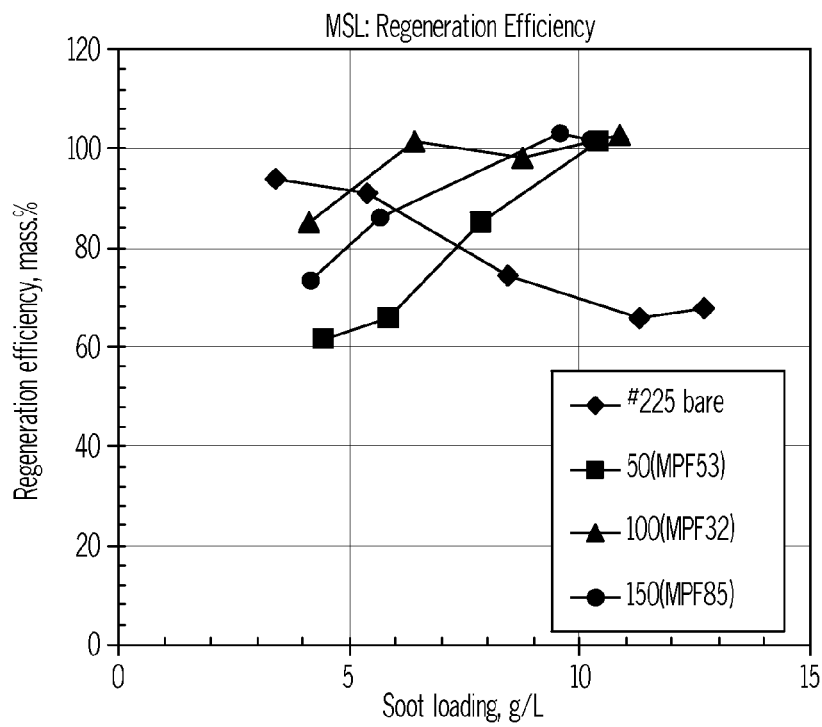

The activity of the filters was compared with the activity of three commercial prototype filters having Pt loading of 50 g/ft$^3$ (50 MPF 53), 100 g/ft$^3$ (100 MPF 32) and 150 g/ft$^3$ (150 MPF 85), respectively. A first comparison was made using the effectiveness of regenerations with increasing soot loading. The effectiveness was evaluated by measuring the filter weight before and after regenerations, and mass of soot still remaining inside the filter was calculated. As can be seen in FIG. 2, the washcoated filters of the present invention exhibited regeneration characteristics comparable with commercial coatings, despite the lower precious metal loading. Filter #56 (Pt—Pd—CuO—$La_2CuO_4$) showed near complete soot regeneration under any soot loading. Filter #57 (Pd only) showed a similar high regeneration effectiveness. Other filters were less effective at low soot loading, but their behavior was still comparable or better than the commercial prototypes as can be seen in FIG. 2.

Figure 3:
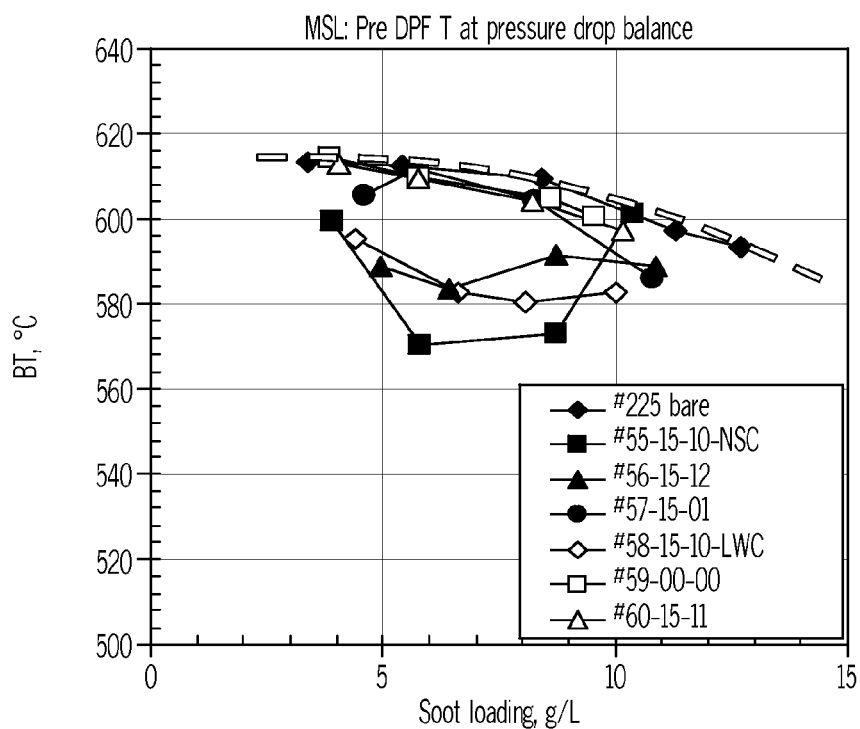
FIG. 3 is a graph illustrating the pressure drop balance temperature of the washcoated filters of the present invention compared with commercially coated filters.

Another important characteristic value of soot oxidation is the balance pressure drop temperature, i.e., the temperature at which no further increase of pressure drop can be found, e.g., dP/dT=0. At this point, the decrease of dP by soot combustion compensates the increase of dP due to the increase of temperature and space velocity. A lower balance pressure drop temperature indicates higher activity in soot oxidation at lower temperatures or more effective soot oxidation ignition. The pressure drop balance temperature of the filters during regeneration is illustrated in FIG. 3. The commercial prototypes demonstrated essentially the same behavior and their balance temperatures are shown by a dashed curve. As the prototypes' balance points are essentially the same as that of an uncoated filter, it can be seen that there is no advantage of using such prototypes for the initiation of soot oxidation in comparison with an uncoated filter. In contrast, both Pt—CuO—$La_2CuO_4$ filters (#55 and #58) and Pt—Pd—CuO—$La_2CuO_t$ (#56) showed much lower balance point temperatures, indicating more effective initiation of soot combustion. The effect was less pronounced on filters #57 (Pd—CuO—$La_2CuO_4$), #59 (Ag—CuO—$La_2CuO_4$) and #60 (silica sol coating).

The reactivity of the soot filters in soot oxidation was also evaluated using steady-state regenerations at 550° C. and soot loading of near 6 g/L. The first regeneration was used to evaluate the initial oxidation activity, and the last regeneration was used to evaluate soot oxidation activity after all drop-to-idle regenerations with soot loadings varying from 4 to 10 g/L, and to evaluate the catalyst survival after such severe regenerations. The reactivity in soot oxidation was calculated from experimental data using Arrhenius equations. The activity in soot oxidation with oxygen was estimated for each filter using the equation:

$$\Delta m_{soot} = M_{soot}^{2/3} \times (K_{O2}[O_2] + k_{NOx}[NO_x]) - \Delta m_{SR}$$

where M=soot mass, $K_{O2}$=the rate constant of soot oxidation with oxygen, $[O_2]$=oxygen concentration, $kNO_x$=the rate constant of soot oxidation with nitrogen oxides, $[NO_x]$=$NO_x$ concentration, and $\Delta m_{SR}$=increase of soot mass due to the soot coming from the engine. The contribution of soot mass decrease from soot oxidation with $NO_x$ was generally very small. The rate constant of activity in soot oxidation with oxygen was evaluated for each filter from the equation:

$$K_{O2} = K^0{}_{O2} \times T \times \exp(E_{act}/T),$$

where T=temperature, $E_{act}$=activation energy of soot oxidation with oxygen, and $E_{act}$=18040K.

Figure 4:
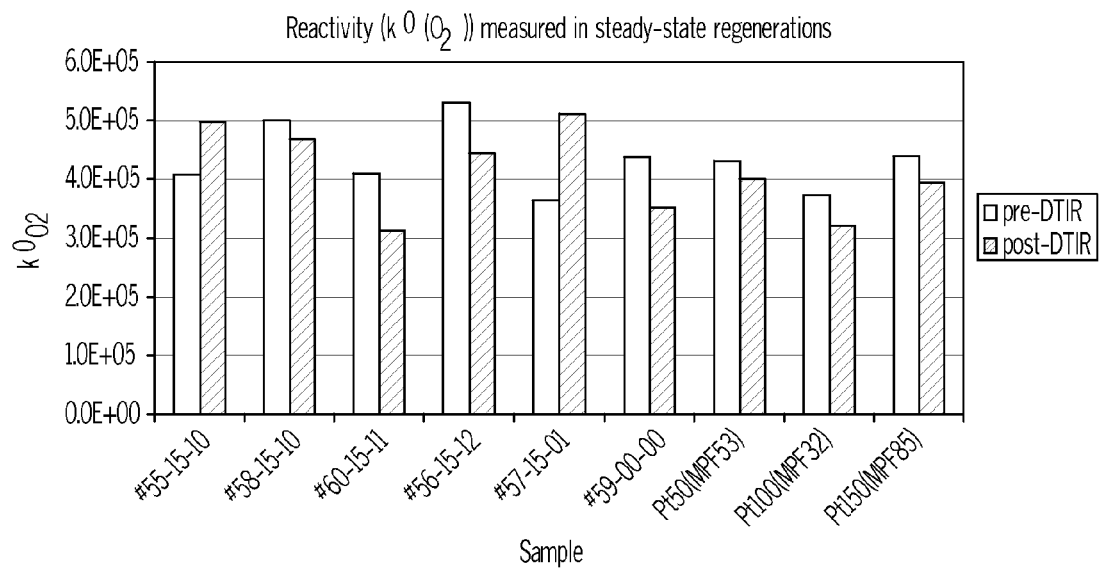
FIG. 4 is a graph illustrating soot oxidation activity during regeneration of washcoated filters of the present invention compared with commercially coated filters.

The values for soot oxidation activity are shown in FIG. 4. As can be seen from the data, the initial activity of the filters of the present invention (#55-60), preliminarily calcined at 750° C. for 16 hours, is higher or comparable than commercial prototypes having higher PGM (Pt) loading. The $K^0{}_{O2}$ values are also generally higher than for commercial prototypes, even for PGM-free (Ag—CuO—La$_2$CuO$_4$) filter #59. The initial activity of filter #56 (Pd—Pt—CuO—La$_2$CuO$_4$) showed the best results among the filters studied.

Figure 5:
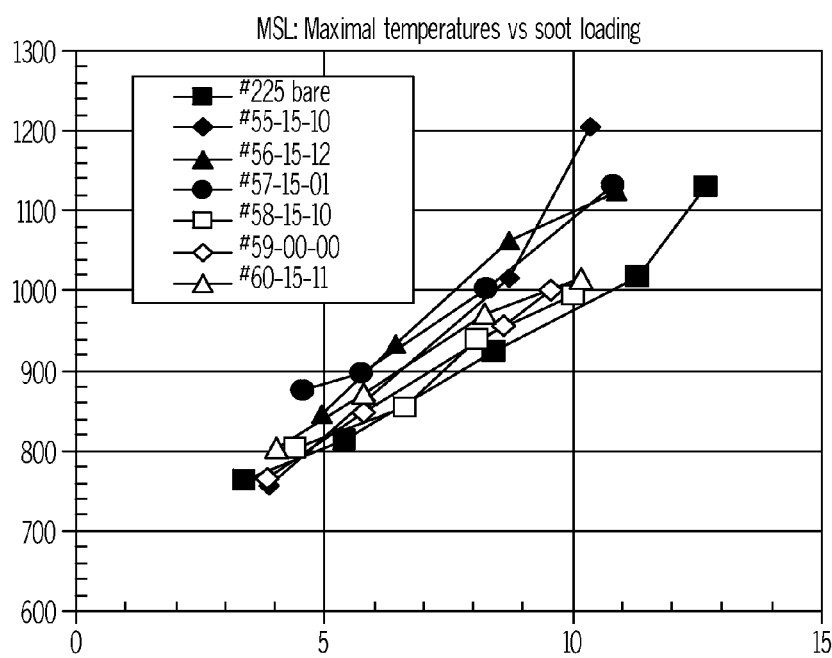
FIG. 5 is a graph illustrating the maximum temperatures reached during regeneration at the highest soot loading.

The maximum temperatures inside of DPFs tested are shown in FIG. 5. As shown, the temperatures reached 1100 to 1200° C. during regeneration events at highest soot loading. The results indicate that generally, the activity in soot oxidation decreased after 5 regenerations for filters of the present invention as well as the commercial prototypes, although only by about 10%. However, this decrease in activity was not found for filters #55 (Pt—CuO—La$_2$CuO$_4$/stabilized alumina) and #57 (Pd—CuO—La$_2$CuO$_4$/stabilized alumina) of the present invention. The use of silica as a support appears to be less effective to prevent catalyst deactivation as can be seen for filter #60.

Figure 6A:
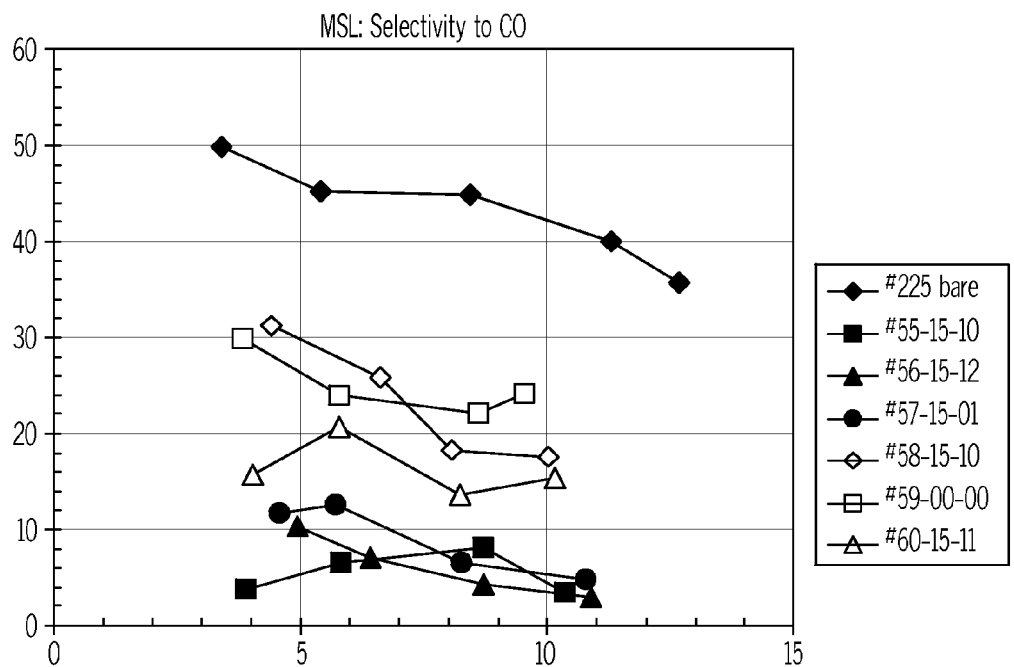
FIGS. 6A and 6B are graphs illustrating CO selectivity during soot oxidation for washcoated filters of the present invention, commercially coated filters, and uncoated filters.
Figure 6B:
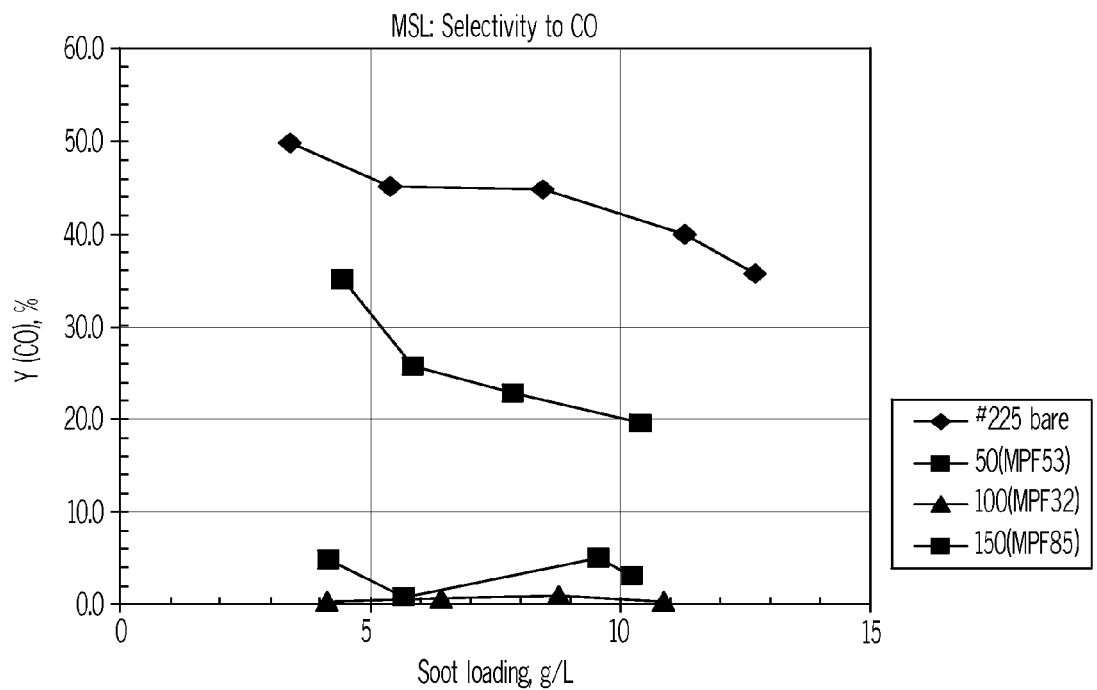

CO selectivity during soot oxidation on different filters is illustrated in FIG. 6. The uncoated filter released the highest amount of CO during regeneration, which is typical for the gas-phase oxidation of soot without catalytic assistance. CO is not a desirable product during filter regeneration; however, CO oxidation to $CO_2$ leads to a large release of heat and an increase in peak temperatures during regeneration that decreases the safety of regenerations. As can be seen in FIG. 5, the maximum temperatures are always higher in catalyzed filters. With regard to CO oxidation to $CO_2$, it would be expected that the filters of the present invention would not perform as well as commercial prototypes which have from 3 to 10 times higher PGM loading. However, all of the filters of the present invention have shown significant CO reduction during regeneration, comparable to that of a commercial filter having the lowest Pt loading among the commercial prototypes (50 g/ft$^3$). Filters #55, 56 and 57 were especially effective with a CO selectivity of less than about 10%. Filter #59 was less effective in CO oxidation due to the absence of active PGM but still provided some CO oxidation. Filter #58 (zirconia support) demonstrated higher CO oxidation, presumably because of the lower surface area of the support.

Figure 7:
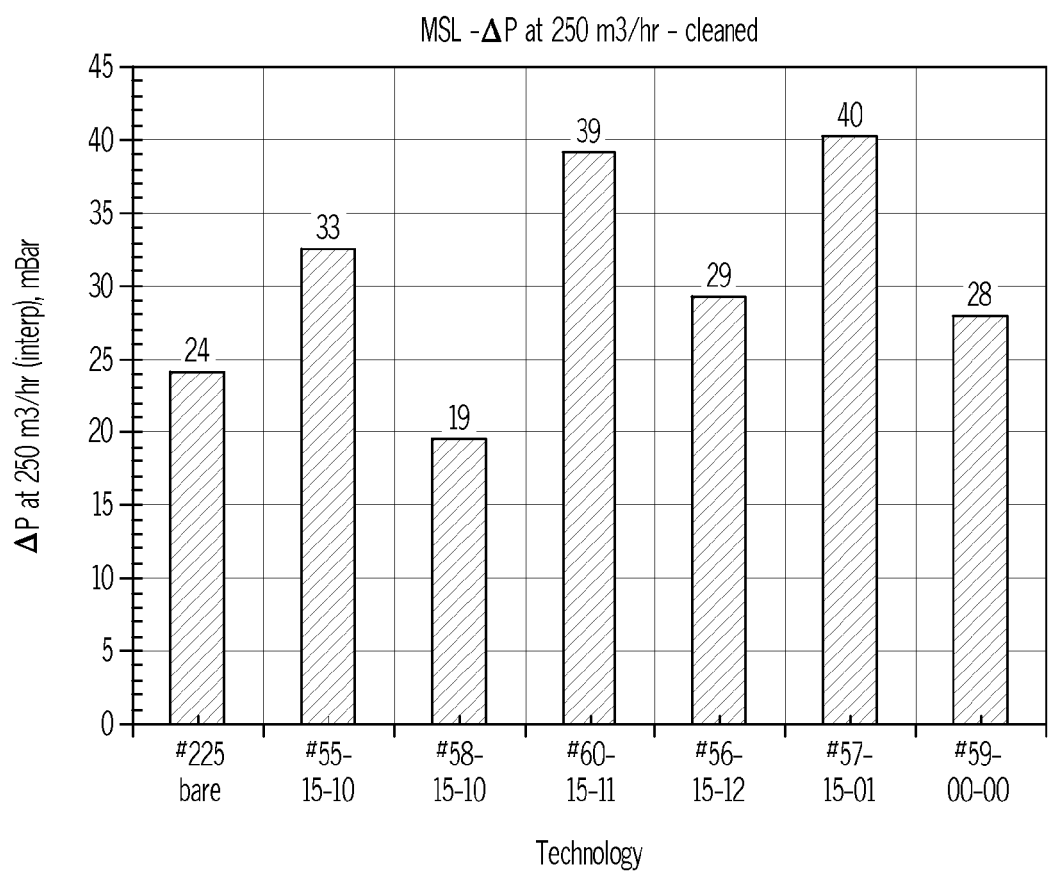
FIG. 7 is a graph illustrating the backpressure of washcoated filters of the present invention and uncoated filters.

Referring now to FIG. 7, a comparison of backpressure of the filters is illustrated. The filters coated in accordance with the present invention have a low increase of filter backpressure. The backpressure of the coated filters was within 19-40 mBar, while the backpressure was 24 mBar for an uncoated filter. The backpressure is also dependent on the support and catalyst loading; e.g., the backpressure was minimal for low-loaded filter #58 (40 g support+catalyst loading) and was near 40 mBar for the most heavily loaded filters #57 and 60 (87-101 g support+catalyst loading). Generally, the backpressure of filters of the present invention was lower than for commercial prototypes, having backpressures in the range of 44-110 mBar, typically 55-80 mBar. This illustrates that the method of coating the filter in accordance with the present invention provides lower backpressure than filters provided with a commercial catalyst coating.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of providing a catalyst composition on a diesel particulate filter comprising:
   providing a diesel particulate filter;
   impregnating said filter with a colloidal solution selected from alumina sol, silica sol, zirconium sol, or combinations thereof to form a support;
   impregnating said filter with a stabilizing solution, said stabilizing solution preventing said support from sintering at temperatures greater than about 1000 to 1200° C.;
   and impregnating said filter with a solution containing a metal oxide precursor selected from the group consisting of copper nitrate, lanthanum nitrate, and mixtures thereof, and a catalytic metal precursor selected from the group consisting of silver nitrate, palladium nitrate, dihydrogen hexachloroplatinate, and combinations thereof.

2. The method of claim 1 including drying and calcining said filter after impregnating with said colloidal solution, after impregnating with said stabilizing solution, and after impregnating with said solution containing said metal oxide precursor and said catalytic metal precursor.

3. The method of claim 1 wherein said colloidal solution further includes an organic compound selected from saccharose, glycerol, or mixtures thereof.

4. The method of claim 1 wherein said colloidal solution comprises an alumina sol and said stabilizing solution comprises zirconyl acetate, lanthanum nitrate, or a combination thereof.

5. The method of claim 1 wherein said colloidal solution comprises silica sol and said stabilizing solution comprises zirconyl acetate, aluminum nitrate, or a combination thereof.

6. The method of claim 1 wherein said colloidal solution comprises zirconia sol and said stabilizing solution comprises lanthanum nitrate.

7. A diesel particulate filter coated by
   impregnating said filter with a colloidal solution selected from alumina sol, silica sol, zirconia sol, or combinations thereof and including an organic compound selected from saccharose, glycerol, or mixtures thereof, and drying the impregnated filter to form a support;
   impregnating said filter with a stabilizing solution selected from the group consisting of comprising zirconyl acetate, lanthanum nitrate, aluminum nitrate, and combinations thereof and drying said filter, said stabilizing solution preventing said support from sintering at temperatures greater than about 1000 to 1200° C.;
   and impregnating said filter with a solution containing a metal oxide precursor selected from the group consisting of copper nitrate, lanthanum nitrate, and mixtures thereof, and a catalytic metal precursor selected from the group consisting of silver nitrate, palladium nitrate, dihydrogen hexachloroplatinate, and combinations thereof and drying said filter.

8. The coated diesel particulate filter of claim 7 wherein said colloidal solution comprises alumina sol or silica sol and wherein said coated filter has a BET surface area of at least 30 $m^2/g$.

9. The coated diesel particulate filter of claim 7 wherein said colloidal solution comprises zirconia sol and wherein said coated filter has a BET surface area of at least 9 $m^2/g$.

10. The coated diesel particulate filter of claim 7 wherein said catalytic metal precursor comprises silver nitrate, palladium nitrate and dihydrogen hexachloroplatinate.

* * * * *